(12) United States Patent
Kostick et al.

(10) Patent No.: US 8,333,866 B2
(45) Date of Patent: Dec. 18, 2012

(54) ANAEROBIC ADHESIVE AND SEALANT COMPOSITIONS IN FILM FORM, FILM SPOOL ASSEMBLIES CONTAINING SUCH COMPOSITIONS IN FILM FORM AND PREAPPLIED VERSIONS THEREOF ON MATABLE PARTS

(75) Inventors: Jeremy Kostick, Marlborough, CT (US); Loren Nauss, Colchester, CT (US); Alessandro Machado Jesus, Rocky Hill, CT (US); Gary Patch, Moosup, CT (US); Gary Tremley, Plainville, CT (US); Kyle Zukauskas, Fairfield, CT (US); Berryinne Decker, Macedonia, OH (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 13/270,496

(22) Filed: Oct. 11, 2011

(65) Prior Publication Data

US 2012/0114898 A1    May 10, 2012

Related U.S. Application Data

(63) Continuation of application No. PCT/US2010/030222, filed on Apr. 8, 2010.

(60) Provisional application No. 61/167,643, filed on Apr. 8, 2009.

(51) Int. Cl.
*A41H 37/00* (2006.01)
*A44B 19/00* (2006.01)
*B29C 65/00* (2006.01)
*B32B 37/00* (2006.01)
*C08J 5/00* (2006.01)
*C09J 7/00* (2006.01)
*C09J 4/00* (2006.01)
*C09J 101/00* (2006.01)
*C09J 201/00* (2006.01)

(52) U.S. Cl. .... 156/313; 156/66; 156/307.1; 156/331.1; 156/331.9; 156/338

(58) Field of Classification Search .................... 156/60, 156/66, 91, 92, 293, 294, 295, 303.1, 304.1, 156/304.2, 307.1, 307.7, 313, 325, 326, 327, 156/330.9, 331.1, 331.7, 331.8, 331.9, 338; 428/98, 221

See application file for complete search history.

(56) References Cited

U.S. PATENT DOCUMENTS 5,187,016 A * 2/1993 Lebez ........................ 428/462
2010/0112272 A1 * 5/2010 Hirano et al. ................ 428/77

FOREIGN PATENT DOCUMENTS

WO     WO 2008/047610 A1 *    4/2008

* cited by examiner

*Primary Examiner* — Philip Tucker
*Assistant Examiner* — Brian R Slawski
(74) *Attorney, Agent, or Firm* — Steven C. Bauman

(57) ABSTRACT

Anaerobic adhesive and sealant compositions in film form, film spool assemblies containing such compositions in film form and preapplied versions thereof on matable parts are provided.

4 Claims, 3 Drawing Sheets

ANAEROBIC ADHESIVE AND SEALANT COMPOSITIONS IN FILM FORM, FILM SPOOL ASSEMBLIES CONTAINING SUCH COMPOSITIONS IN FILM FORM AND PREAPPLIED VERSIONS THEREOF ON MATABLE PARTS

CROSS-REFERENCE TO RELATED APPLICATIONS

This application is a continuation of International Application No. PCT/US2010/030222, filed Apr. 8, 2010, which in turn claims priority to U.S. Provisional Application No. 61/167,643, filed Apr. 8, 2009.

BACKGROUND

1. Field

Anaerobic adhesive and sealant compositions in film form, film spool assemblies containing such compositions in film form and preapplied versions thereof on matable parts are provided.

2. Brief Description of Related Technology

The use of liquid polymerizable or curable substances for the purpose of sealing and locking interfitting parts is well known in the art. Early threadlocking compositions were applied in liquid form shortly before or at the time of assembly of the interfitting parts. The compositions were applied wet and cured only after the interlocking of the mated parts.

In many applications, wicking of the liquid composition into tight spaces between adjoining parts is desirable. However, in many situations the ability of the liquid adhesive to migrate from parts is problematic, causing contamination of sensitive parts. Moreover, in many maintenance applications, the spillage of liquid adhesive compositions can be deleterious as well as inconvenient.

U.K. Patent Application No. GB 2060669 (Moran) speaks to anaerobically curing rubber adhesive compositions, which may be in the form of sheets, tapes, ribbons or latex. Moran uses a rubber in an amount of 30% to 80% by weight in the composition, presumably to assist in processing the composition to form the film. However, the large amount of rubber reduces the ability to form a robust bond when assembled between two matable parts.

One attempt to create a convenient ready-to-use threadlocking product has been the use of preapplied adhesive compositions, such as those in latex or micro-encapsulated form.

In such cases, the adhesive composition is applied to the threaded part, such as a bolt or nut, and remains in the uncured state until mated. As an example of a known preapplied adhesive composition, U.S. Pat. No. 4,497,916 discloses a continuous liquid phase adhesive composition to which is added solid wax-like particles dispersed therein. These particles may be chosen from polyethylene glycol materials having 4,000 to 20,000 molecular weight, stearic acid, acid waxes or stearic esters. The compositions disclosed in the '916 patent are formed by heating this combination of materials in slurry form and applying it, while heated, to threads. The composition then cools to obtain a non-mobile coating. This composition requires substantial preparation in order to obtain the composition and apply it on parts.

Such locking compositions, however, were not suitable for many applications in industries with high rates of assembly and mass production, such as the automotive industry.

As a result pre-applied sealant and locking coatings were developed for use in these industries. Indeed, pre-applied sealant coatings are now preferred in such industries due to their many advantages. Pre-applied sealant or locking coatings which were initially developed were deposited on threaded fasteners as dry to the touch coatings in which uncured polymerizable fluids were encapsulated or skinned over within a dry coating on the fastener. Assembly of the fasteners with a corresponding threaded part, e.g. a nut, caused fracture of the microcapsule coating or skin and exposure of the underlying polymerizable fluid to curing conditions, e.g. anaerobic cure.

For instance, U.S. Pat. No. 4,325,985 describes a method in which a polymerizable fluid material is deposited on a threaded part, and a separate fluid film-forming cover coat is applied thereover immediately after, forming a thin, solid, dry, non-tacky film by brief exposure to radiation, such as ultra-violet radiation. The radiation-curable film-forming cover coat is cured through its depth, leaving the polymerizable locking material still fluid for subsequent cure upon mating of threaded parts. The radiation-curable film is a protective skin designed to be dry and non-tacky.

U.S. Pat. No. 4,632,944 discloses a dual curing composition for use on threadlocking articles. The first curing mechanism is initiated by radiation such as ultraviolet radiation light. An opacifier, such as a powder, is dispersed therein rendering the polymerizable solution opaque to the radiation beyond the surface layer. A dry tack free crust is therefore formed on the surface. The second polymerization mechanism is thereafter initiated on the remaining polymerizable fluid once the two engineering parts are assembled together.

Pre-applied fasteners, i.e. fasteners having a sealant or locking composition on their threads, are normally shipped in bulk. They are often loose in the shipping container and in direct contact with each other. Pre-applied fasteners which rely on a protective skin over a fluid sublayer have a potential for rupture of the skin in the shipping containers or storage, with subsequent leakage of the polymerizable composition is common, resulting in unusable parts. Fasteners may adhere to each other due to this leakage, or be difficult to handle due to uncured liquid contaminating their exterior. In such cases, the fastener product is rendered unusable. Further, the skin enclosing the polymerizable fluid is usually not an integral part of the final polymerized composition. The adhesive force of the resultant bond may not be as great as if it were the polymerizable fluid alone.

Other alternatives to the skinned over uncured liquid versions of pre-applied threadlocking products have been developed. Fully cured latex coatings are a known alternative for sealing purposes. Cured latex coatings do not suffer from potential rupture of polymerizable liquid, but are expensive to produce because they require oven curing at relatively high temperatures for 45 minutes or longer. The most common method used in the industry today to dry latex coatings is to employ the use of a gas fired oven. Typically the forced hot air is recirculated within the confines of the oven's inner housing. Temperatures are typically maintained at 155° F. (68° C.) or so). This method of drying is costly and its relative inefficiency is increased by heat loss at the entrance and exit of the conveyor belt openings which run through the housings of conventional industrial ovens. Care must also be exercised so that the temperature does not reach the point of creating steam which causes creators on the surface of the coating. When creators are present, the integrity of the adhesion is compromised and the coating will chip and peel off the threaded fastener, as well as creating an undesirable appearance. It becomes necessary to control the ramp-up speed and allow the fastener to uniformly heat through to avoid removing the water too rapidly. Moreover, latex coatings often become brittle and flake or peal during storage, particularly if exposed to uncontrolled environmental conditions. Additionally, dried latex coatings do not possess the capability to be further physically tailored or altered to the particular needs of threaded applications.

Henkel Corporation recently introduced a line of products based on anaerobically curable compositions in non-flowable form. These products—or anaerobic sticks, as they are frequently called—are prepared from at least one room-temperature flowable polymerizable compound; and a polymeric matrix selected from urea-urethanes, hydroxy or amine-modified aliphatic hydrocarbons, polyester-amide-based rheological additives and combinations thereof. The polymeric matrix is present in an amount sufficient to render the composition non-flowable at temperatures up to about 180° F. (82° C.) and dispensable at room temperature without application of heat.

While tremendously successful, the anaerobic stick product line does not address the desire of many end users to have an anaerobic adhesive or sealant film product or an anaerobic adhesive or sealant preapplied product.

SUMMARY

The present invention surprisingly permits an anaerobic adhesive or sealant in film form to be made while using less rubber (with an upper limit of 20% by weight, it is at least 50% less than the amounts used in the past) and in so doing permits an anaerobic adhesive or sealant composition in film form to be made that is capable of forming a robust bond between the matable parts and while maintaining an open time of at least 8 days at room temperature once applied onto the surface of at least one of the matable parts, prior to mating. Indeed, some substrates allow for an open time of 4, 6, or even 20 weeks, once applied onto the surface of at least one of the matable parts, prior to mating. The significance of the open time is tremendous because it allows an end user to take an anaerobic adhesive or sealant in film form made in accordance with the present invention, and apply it to a matable part (such as the threads of a bolt) in advance of mating the parts. The increase to throughput and efficiency of such a practice is enormous.

More specifically, in one aspect, provided is a method of manufacturing an anaerobic adhesive or sealant film adapted to be preapplied to a first surface to be mated, which demonstrates an open time of at least 8 days at room temperature prior to mating with another surface. The method includes the steps of:

Providing an anaerobic adhesive or sealant film comprising:
A first layer constructed from a nylon/urethane blend;
A layer of anaerobic adhesive or sealant disposed on at least a portion of the first layer, such as where the anaerobic adhesive or sealant comprises a (meth)acrylate component; an anaerobic cure system; a polymeric matrix and a rubber component in an amount less than 20% by weight of the anaerobic adhesive or sealant; and
A second layer constructed from a nylon/urethane blend; dispersed on at least a portion of the layer of anaerobic adhesive or sealant
Providing a first surface to be mated;
Applying the anaerobic adhesive or sealant film onto at least a portion of the first surface to be mated to form an anaerobic adhesive or sealant film preapplied onto the first surface to be mated;
Allowing the anaerobic adhesive or sealant film preapplied onto the first surface to be mated to have an open time; and Providing a second surface to be mated with the anaerobic adhesive film preapplied first surface after the open time, where when mated the anaerobic adhesive or sealant film is disposed between the first and second surfaces to be mated and cures under anaerobic conditions within a period of time of about 24 hours at room temperature.

Desirably, the first surface to be mated comprises a threaded bolt, and the second surface to be mated comprises a threaded nut. Here, the threaded bolt and the threaded nut have complimentary threads.

In another aspect, provided is an anaerobic adhesive or sealant film comprising:
A first layer constructed from a nylon/urethane blend;
A layer of anaerobic adhesive or sealant disposed on at least a portion of the first layer; and
A second layer constructed from a nylon/urethane blend, where the film has a cross sectional thickness.

In yet another aspect, provided is an article of commerce comprising:
A container in which is disposed an anaerobic adhesive or sealant film, where the anaerobic adhesive or sealant film comprises:
A first layer constructed from a nylon/urethane blend;
A layer of anaerobic adhesive or sealant disposed on at least a portion of the first layer such as where the anaerobic adhesive or sealant comprises a (meth)acrylate component; an anaerobic cure system; a polymeric matrix and a rubber component in an amount less than 20% by weight of the anaerobic adhesive or sealant; and
A second layer constructed from a nylon/urethane blend.

A threaded article, as well as a method of manufacturing the threaded article, is also provided. Also provided is a method of sealing using the threaded article.

Also provided are unassembled, i.e. uncoupled, threaded articles such as nuts, bolts, screws, pipes and the like, having an anaerobic adhesive or sealant in film form adheringly coating at least a portion of the threads.

Also provided is a method of manufacturing an unassembled threaded article having a anaerobic sealant in film form coating at least a portion of the thread groove of the article.

Also provided is a spool assembly for housing a length of film. The spool assembly includes a spool having a shaft and at least one spool flange; and a spool housing having a base and a cannular wall structure. The shaft is a substantially hollow cylinder defining an axis with the spool flange mounted at one end of the shaft. The spool flange is in the shape of a polygon. The spool housing is in the shape of the polygon and is adapted to releasably receive the spool therein. In use, about the shaft is disposed an anerobic adhesive or sealant in film form, particularly one as is described and disclosed herein.

DETAILED DESCRIPTION

Figure 1:
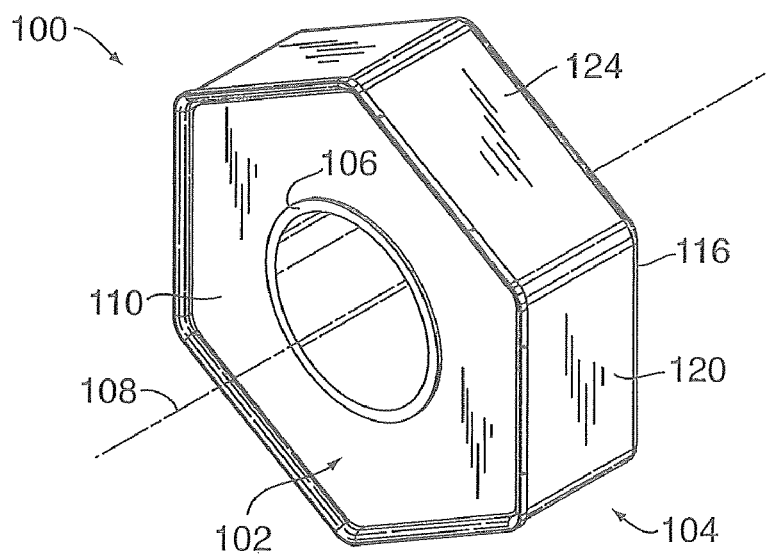
FIG. 1 is a front, right-hand side perspective view of an embodiment of a tape spool assembly, according to the present invention.
Figure 2:
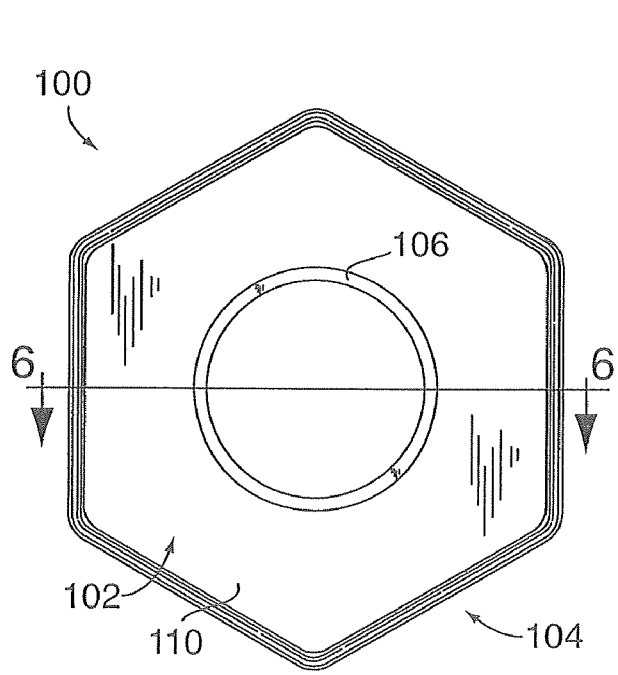
FIG. 2 is a front view of the tape spool assembly of FIG. 1.
Figure 3:
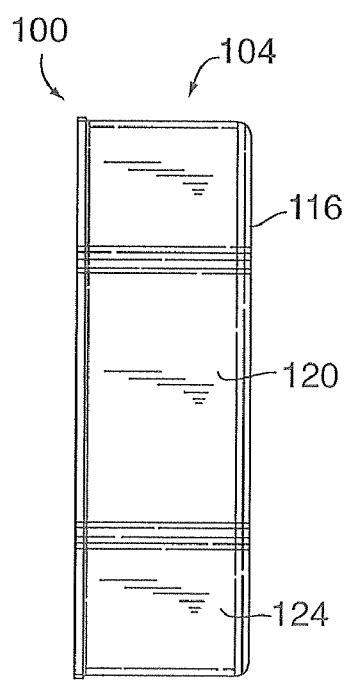
FIG. 3 is a right-hand side view of the tape spool assembly of FIG. 1.
Figure 4:
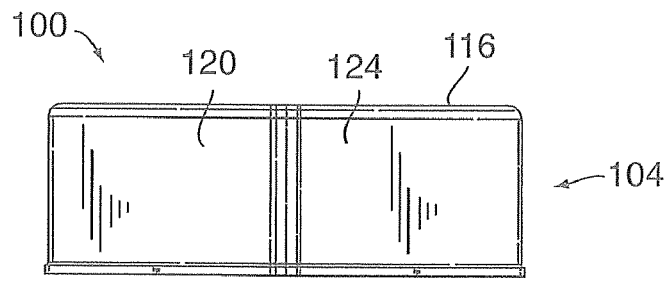
FIG. 4 is a top view of the tape spool assembly of FIG. 1.
Figure 6:
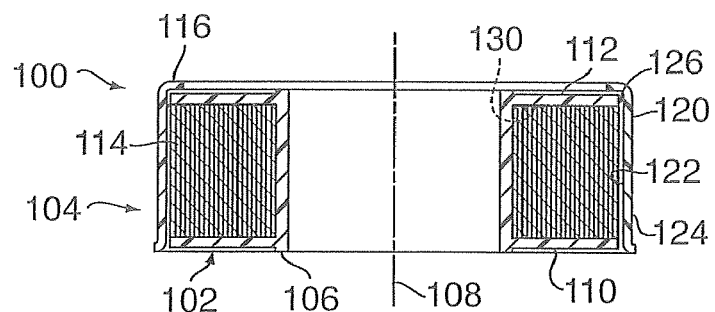
FIG. 6 is a top sectional view of the tape spool assembly of FIG. 1, taken along line 6-6 of FIG. 2.
Figure 5:
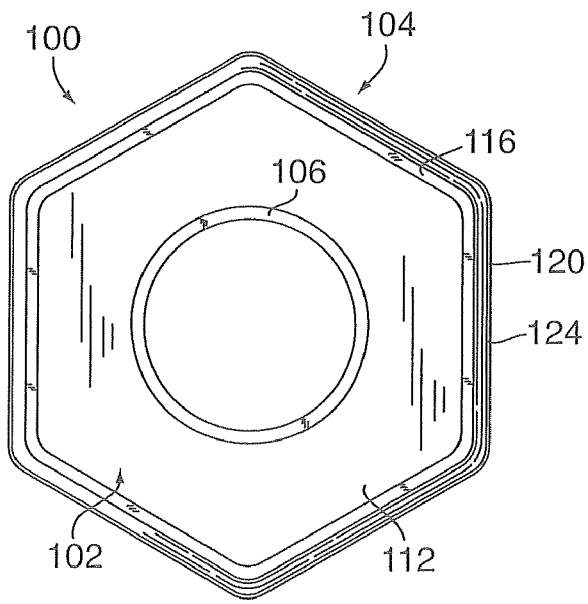
FIG. 5 is a rear view of the tape spool assembly of FIG. 1.

In one aspect, provided is a method of manufacturing an anaerobic adhesive or sealant film adapted to be preapplied to a first surface to be mated, which demonstrates an open time of at least 8 days at room temperature prior to mating with another surface. The method includes the steps of:

Providing an anaerobic adhesive or sealant film comprising:

A first layer constructed from a nylon/urethane blend;

A layer of anaerobic adhesive or sealant disposed on at least a portion of the first layer, such as where the anaerobic adhesive or sealant comprises a (meth)acrylate component; an anaerobic cure system; a polymeric matrix and a rubber component in an amount of less than 20% by weight of the anaerobic adhesive or sealant; and A second layer constructed from a nylon/urethane blend disposed on at least a portion of the layer of anaerobic adhesive or sealant;

Providing a first surface to be mated;

Applying the anaerobic adhesive or sealant film onto at least a portion of the first surface to be mated to form an anaerobic adhesive or sealant film preapplied onto the first surface to be mated;

Allowing the anaerobic adhesive or sealant film preapplied onto the first surface to be mated to have an open time; and Providing a second surface to be mated with the anaerobic adhesive or sealant film preapplied first surface after the open time, where when mated the anaerobic adhesive or sealant film is disposed between the first and second surfaces to be mated and cures under anaerobic conditions within a period of time of about 24 hours at room temperature.

Desirably, the first surface to be mated comprises a threaded bolt, and the second surface to be mated comprises a threaded nut. Here, the threaded bolt and the threaded nut have complimentary threads.

In another aspect, provided is an anaerobic adhesive or sealant film comprising:

A first layer constructed from a nylon/urethane blend;

A layer of anaerobic adhesive or sealant disposed on at least a portion of the first layer, such as where the anaerobic adhesive or sealant comprises a (meth)acrylate component; an anaerobic cure system; a polymeric matrix and a rubber component in an amount of less than 20% by weight of the anaerobic adhesive or sealant; and A second layer constructed from a nylon/urethane blend, where the film has a cross sectional thickness.

The present invention provides such a threaded article, as well as a method of manufacturing the threaded article. Also provided is a method of sealing using the threaded article of the present invention.

The present invention is also directed to unassembled, i.e. uncoupled, threaded articles such as nuts, bolts, screws, pipes and the like, having an anaerobic sealant in film form adheringly coating at least a portion of the threads.

The present invention also relates to a method of manufacturing an unassembled threaded article having a anaerobic adhesive or sealant in film form coating at least a portion of the thread groove of the article.

In yet another aspect, an article of commerce is provided comprising:

A container in which is disposed an anaerobic adhesive or sealant film, where the anaerobic adhesive or sealant film comprises:

A first layer constructed from a nylon/urethane blend;

A layer of anaerobic adhesive or sealant disposed on the first layer; and

A second layer constructed from a nylon/urethane blend.

More specifically, referring to FIGS. 1-7, a spool assembly 100 includes a spool 102 and a spool housing 104. The spool 102 includes a shaft 106, which is in the form of a hollow cylinder and defines an axis 108. The spool 102 also includes spool flanges 110, 112 disposed at each end of the shaft 106. The shaft 106 has an axial length substantially equal to an axial length of the cannular wall structure. Film 114 is coiled around the spool 102, between spool flanges 110, 112. The width of film 114 should not be more than an axial length of the shaft. The spool housing 104 includes a base 116 and a cannular wall structure 120. The base 116 may be a lip-like extension at an end of the spool housing 104, but may also be substantially flat and cover some or all of the area at an end of the spool housing 104. The cannular wall structure 120 defines an interior wall face 122, an exterior wall face 124, and an interior cavity 126. In one embodiment, the wall structure 120 is in the shape of a polygon and further includes at least one detent 130, which extends from interior wall face 120 into the cavity 126, proximate to the base 116.

Figure 7:
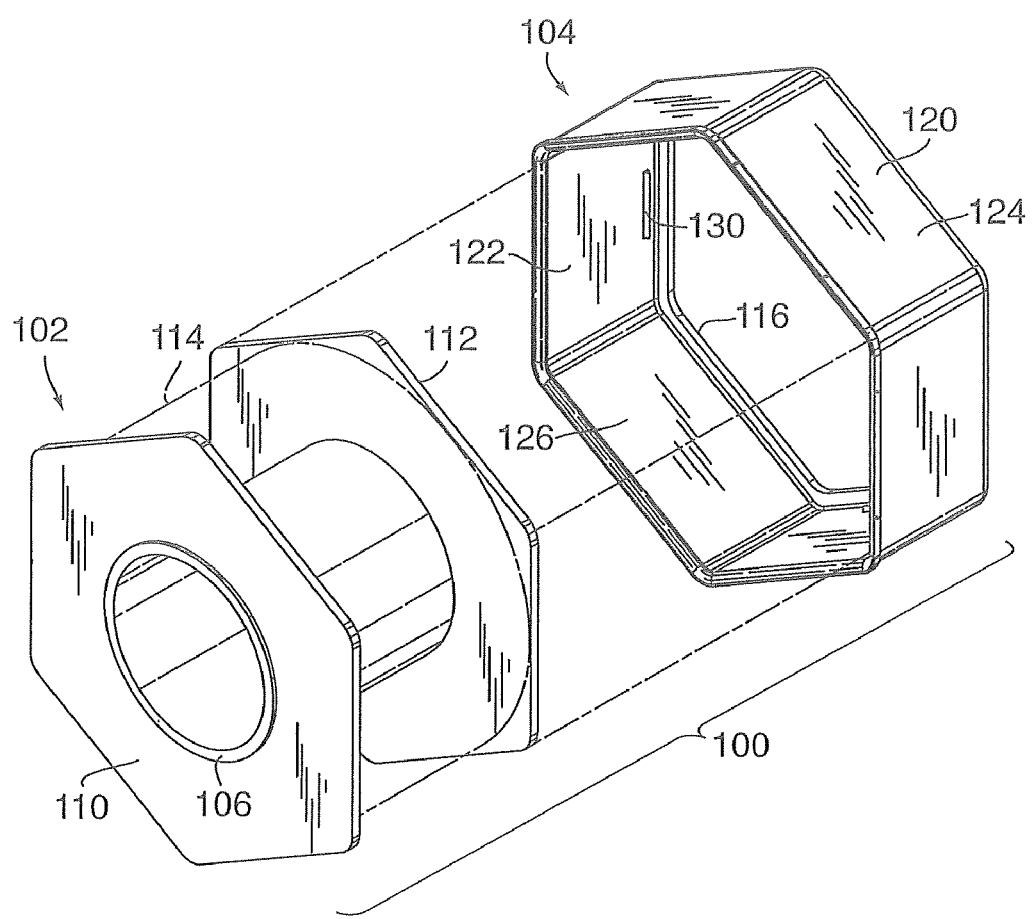
FIG. 7 is an exploded front, right-hand side perspective view of the tape spool assembly of FIG. 1.

In operation, as is shown in FIG. 7, spool 102 is adapted to be inserted into the cavity 126 of the spool housing 104. In one embodiment, the shape of spool flanges 110, 112 corresponds to the polygonal shape of wall structure 120. When the spool 102 is fully inserted into the spool housing 104, the spool flange 112 of the spool 102 is releasably secured between the detent 130 and the base 116.

Film 114 (i.e., an anaerobic adhesive or sealant in film form) may be dispensed from the spool assembly 100 and applied onto a threaded article prior to mating with another complimentary threaded part, and remain there for an extended open time. The anaerobic adhesive or sealant in film form is capable of remaining in the open state of at least 8 days at room temperature. This is a major departure from known anaerobically curable adhesives and sealants, where known compositions were applied to a part which was then subsequently mated without an open time of any significance due to the flowable nature of the known compositions.

The compositions are based on anaerobic adhesive and sealant chemistry with (i) a polymeric matrix and (ii) a rubber component in an amount of up to 20% by weight, added thereto.

The composition includes:

a (meth)acrylate component, an anaerobic cure system, a polymeric matrix, such as in the amount of about 0.5% to about 10% by weight, and a rubber component in an amount of less than 20% by weight, such as about 5% to about 15% by weight.

(Meth)acrylate monomers suitable for use as the (meth)acrylate component may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Other (meth)acrylate monomers may also be used, such as reaction products of the diglycidylether of bisphenol-A with methacrylic acid and a (meth)acrylate ester corresponding to structure as shown below:

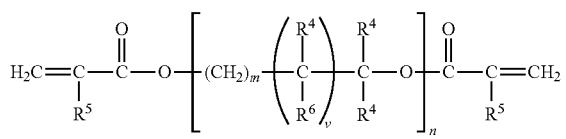

where $R^4$ may be selected from hydrogen, alkyl groups having from 1 to about 4 carbon atoms, hydroxyalkyl groups having from 1 to about 4 carbon atoms or

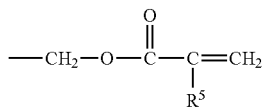

$R^5$ may be selected from hydrogen, halogen, and alkyl groups of from 1 to about 4 carbon atoms;

$R^6$ may be selected from hydrogen, hydroxy and

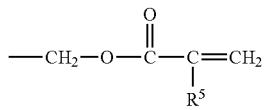

m is an integer equal to at least 1, e.g., from 1 to about 8 or higher, for instance, from 1 to about 4;

v is 0 or 1; and n is an integer equal to at least 1, e.g., 1 to about 20 or more.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol)dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Of course, combinations of these (meth)acrylate monomers may also be used.

The (meth)acrylate component should comprise from about 10 to about 90% by weight of the composition, such as about 60 to about 90% by weight, based on the total weight of the anaerobic adhesive or sealant layer.

The anaerobic cure system may include saccharin, toluidines, such as N,N-diethyl-p-toluidine ("DE-p-T") and N,N-dimethyl-o-toluidine ("DM-o-T"), acetyl phenylhydrazine ("APH"), maleic acid, and stabilizers like quinones, such as napthaquinone and anthraquinone. See e.g. U.S. Pat. Nos. 3,218,305 (Krieble), 4,180,640 (Melody), 4,287,330 (Rich) and 4,321,349 (Rich).

In addition and sometimes in the alternative to some of the components listed in the preceding paragraph as constituents of the anaerobic cure system, more recently Henkel Corporation has discovered a series of anaerobic cure accelerators, some of which are set forth below:

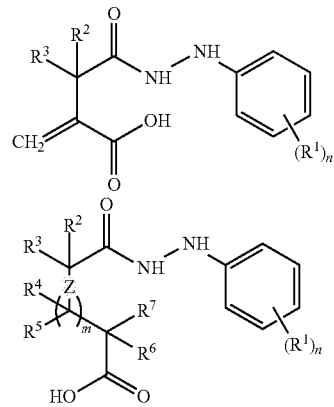

where $R^1$-$R^7$ are each independently selected from hydrogen or $C_{1-4}$; Z is a carbon-carbon single bond or carbon-carbon double bond; m is 0 or 1; and n is an integer between 1 and 5;

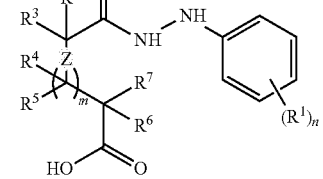

where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded therefrom;

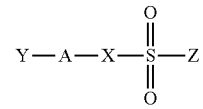

where R is hydrogen, halogen, alkyl, alkenyl, hydroxyalkyl, hydroxyalkenyl, carboxyl, or sulfonato, and $R^1$ is as defined above and alkenyl, hydroxyalkyl, hydroxyalkenyl, or aralkyl. See U.S. Pat. Nos. 6,835,762, 6,897,277 and 6,958,368.

In addition, Loctite (R&D) Ltd. designed anaerobically curable compositions using the following trithiadiaza pentalenes as a cure accelerator:

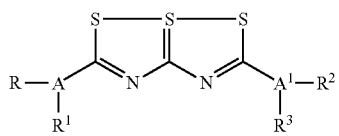

where A and $A^1$ may be selected from O and N; and

R, $R^1$, $R^2$ and $R^3$ may be the same or different, are as defined above and cycloalkyl, cycloclkenyl, and aryl, having from 1 to about 30 carbon atoms, and may be substituted or interrupted with a heteroatom, and heterocyclic structures, or $R^1$ and $R^3$ taken together may join to form a cyclic structure having from about 20 to about 28 ring atoms, and together represent dialkyl substituted polyether structures that may be substituted or interrupted with the trithiadiaza pentalene structure, which itself may or may not be substituted by $A^1$, $R^2$, or $R^3$, as defined above. See U.S. Pat. No. 6,583,289 (McArdle).

Triazine/thiol anaerobic cure systems may also be used in the practice of the present invention. For instance, U.S. Pat. Nos. 4,413,108, 4,447,588, 4,500,608 and 4,528,059, each speak to such a system, and the entirety of each of which is hereby expressly incorporated herein by reference.

A number of well-known initiators of free radical polymerization are typically incorporated into anaerobic cure system as well including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

The anaerobic cure system may be used in amounts of about 0.1 to about 10% by weight, such as about 1 to about 5% by weight, based on the total weight of the anaerobic adhesive or sealant layer.

The anaerobic adhesive or sealant layer may also include other conventional components, such as inhibitors of free radical generation, as well as metal catalysts, like iron and copper.

In addition, other components may be included in the anaerobic adhesive or sealant layer, such as Teflon, talc, fluorescing agents and the like.

The rubber component may be selected from many possibilities, such as poly(propylene)oxide; polyether sulfone, such as PES 5003P, available commercially from Sumitomo Chemical Company, Japan; carboxy-terminated acrylonitrile butadienes; hydroxy-terminated acrylonitrile butadienes; core shell polymers; and BLENDEX 338, SILTEM STM 1500 and ULTEM 2000, which are available commercially from General Electric Company. ULTEM 2000 (CAS Reg. No. 61128-46-9) is a polyetherimide having a molecular weight ("Mw") of about 30,000±10,000. Those available commercially from Zeon Chemicals under the tradename NIPOL are also desirable. Of the NIPOL branded rubbers, acrylonitrile polybutadiene rubbers are particularly desirable.

The polymeric matrix includes an organic material which generally has a melting point or softening point range in the range of about 200° F. (93° C.) to about 500° F. (260° C.). Polymeric matrices may be selected from urea-urethanes, hydroxy or amine modified aliphatic hydrocarbons (such as castor oil-based rheological additives), liquid polyesteramide-based rheological additives and combinations thereof. One such polyamide is commercially available as a non-reactive free flowing powder under the tradename DISPARLON 6200, from King Industries Specialties Company, Norwalk, Conn. Other polyamides include DISPARLON 6100 and 6500. The recommended use in accordance with commercially available data sheets for DISPARLON 6200 is for epoxy adhesive and potting compounds in amounts of about 0.5% to about 3% by weight; the recommended use in accordance with commercially available data sheets for DISPARLON 6500 is for epoxy adhesive and potting compounds in amounts of about 0.5% to about 3% by weight. Use of the polymeric matrix in the noted amounts results in reduction of "edge-ooze" or edge migration, which is a recognized problem.

The anaerobic adhesive or sealant layer includes the presence of the polymeric matrix in amounts of about 0.5% to about 10%, for instance about 1% to about 5%, such as about 2% to about 4%, by weight of the total composition.

In addition, the polymeric matrix may further include polyamides (such as those having a particle size less than about 15 microns), polyacrylamides, polyimides, and polyhydroxyalkylacrylates.

A more particular description of a urea-urethane includes a combination of an alkali metal cation and the reaction product of (a) a polyfunctional isocyanate and an hydroxy and an amine; or (b) a phosgene or phosgene derivative, and a compound having 3 to 7 polyethylene ether units terminated at one end with an ether group and at the other end with a reactive functional group selected from an amine, an amide, a thiol or an alcohol; or c) a monohydroxy compound, a diisocyanate and a polyamine. When the reaction product described in (c) is employed it is generally formed by first reacting a monohydroxy compound with a diisocyanate to form a mono-isocyanate adduct, and subsequently reacting the mono-isocyanate reaction product with a polyamine in the presence of an alkali metal salt and aprotic solvent, as described in U.S. Pat. No. 4,314,924, the disclosure of which is hereby expressly incorporated herein by reference. A commercially available version of the reaction product described is believed to be BYK-410, from BYK-Chemie, Wallingford, Conn. BYK-Chemie describes this reaction product as a urea-urethane.

Useful isocyanates for forming the reaction product(s) of the additive include polyisocyanates such as phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates.

Useful alcohols for reacting with the polyisocyanates also include polyethyl glycol ethers having 3-7 ethylene oxide repeating units and one end terminated with an ether or an ester, polyether alcohols, polyester alcohols, as well as alcohols based on polybutadiene. The specific type of alcohol chosen and the molecular weight range can be varied to achieve the desired effect. Generally, monohydroxy compounds, straight or branched chain aliphatic or cyclic primary or secondary alcohols containing $C_{5-25}$, and alkoxylated derivatives of these monohydroxy compounds are useful.

Phosgene and phosgene derivatives, such as bischloroformates, may be used to make the reaction product of the additive (c). These compounds are reacted with a nitrogen-containing compound, such as an amine, an amide or a thiol to form the adduct. Phosgenes and phosgene derivatives may also be reacted with an alcohol to form the reaction product.

The alkali metal cations are usually provided in the form of a halide salt. For example, sodium, potassium and lithium halide salts are useful. In particular, sodium chloride, sodium iodide, sodium bromide, potassium chloride, potassium iodide, potassium bromide, lithium chloride, lithium iodide, lithium bromide and combinations thereof may be employed.

The reaction products of additive (c) of the present invention are usually present in and added to the composition with an alkali metal salt, in a solvent carrier. The solvents are desirably polar aprotic solvents in which the reaction to form the reaction product was carried out. For example, N-methylpyrrolidone, dimethylsulfoxide, hexamethylphosphoric acid triamine, N,N-dimethylformamide, N,N,N',N'-tetramethylurea, N,N-dimethylacetamide, N-butylpyrrolidone, tetrahydrofuran and diethylether may be employed.

One particularly desirable additive is the combination of a lithium salt and a reaction product which is formed by reacting a monohydroxy compound with a diisocyanate compound to form a mono-isocyanate first adduct, which is subsequently reacted with a polyamine in the presence of lithium chloride and 1-methyl-2-pyrrolidone to form a second adduct.

Amines which can be reacted with phosgene or phosgene derivatives to make the reaction product include those which conform to the general formula $R^{11}$—$NH_2$, where $R^{11}$ is aliphatic or aromatic. Desirable aliphatic amines include polyethylene glycol ether amines. Desirable aromatic amines include those having polyethylene glycol ether substitution on the aromatic ring.

For example, commercially available amines sold under the tradename JEFFAMINE by Huntsman Corporation, Houston, may be employed. Examples include JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJT-509, JEFFAMINE T-3000, JEFFAMINE T-5000, and combinations thereof.

Another polymeric matrix useful herein includes hydroxyl or amine modified aliphatic hydrocarbons and liquid polyester-amide based rheological additives. Hydroxy or amine modified aliphatic hydrocarbons include THIXCIN R, THIXCIN GR, THIXATROL ST and THIXATROL, GST available from Rheox Inc., Hightstown, N.J. These modified aliphatic hydrocarbons are castor oil based materials. The hydroxyl modified aliphatic hydrocarbons are partially dehydrated castor oil or partially dehydrated glycerides of 12-hydrostearic acid. These hydrocarbons may be further modified with polyamides to form polyamides of hydroxyl stearic acid are described as being useful polyamides.

Liquid polyester-amide based rheological additives include THIXATROL TSR, THIXATROL SR and THIXATROL VF rheological additives available from Rheox Inc., Hightstown, N.J. These rheological additives are described to be reaction products polycarboxylic acids, polyamines, alkoxylated polyols and capping agents. Useful polycarboxylic acids include sebacic acid, poly(butadiene)dioic acids, dodecane dicarboxylic acid and the like. Suitable polyamines include diamine adkyls. Capping agents are described as being monocarboxylic acids having aliphatic unsaturation.

The anaerobic adhesive or sealant layer (referred to below as the middle layer) may be prepared by a solvent casting method, or other film forming methods.

The outer layers of the anaerobic adhesive or sealant in film form may be formed from a nylon/polyurethane blend, which may also be prepared by a solvent casting method. However, the outer layers may be constructed from other materials, such as low density Polyethylene, polypropylene, or Teflon. The outer layers themselves may be the same or different.

The thickness of each of the outer layers should be in the range of 0.25 mils-0.35 mils. If the layer is too thin, the layer may have insufficient strength to allow for optimal dispensing onto a matable part. If on the other hand the layer is too thick, it may become difficult to assemble the nut onto the bolt and access to the anaerobic adhesive and sealant layer between the two outer layers of the film may be reduced.

The anaerobic adhesive or sealant which will form the middle layer may be solvent cast. In this method the solution is cast onto a continuous roll of a release liner and permitting the solvent to evaporate to form the respective film.

Rheology is an important aspect of the anaerobic adhesive and sealant layer of the film, because if the viscosity is too high hand turning of a nut onto a bolt having the film disposed on the threads thereof becomes difficult, and in some instances requires the use of tools to advance the nut onto the bolt and secure the assembly. If the viscosity is too low, the anaerobic adhesive and sealant layer of the film may tend to migrate out from between the outer two layers.

The anaerobic adhesive or sealant in film form may be thus be assembled.

EXAMPLES

Sample A was prepared from two separate batches: a middle layer of anaerobic composition and two outer layers made from the same material.

The identity and amounts of the various constituents are listed below. The constituents for the two batches were added to a vessel with mixing, and then solvent cast to form the appropriate layer.

The middle layer is made from:
Polyethylene glycol dimethacrylate 7.2 kg
Hydroxypropyl methacrylate 1.8 kg
1-Acetyl-2-phenyldrazine 18 g
Benzoic sulphimide 288 g
Cumene hydroperoxide 450 g
Napthaquinone (200 ppm) 90 g
$SiO_2$ 900 g
PTFE 360 g
NIPOL (10% in MEK) 18 kg
EDTA (3.5% in methanol/water) 180 g
Talc 90 g
Scanning compound #5 2 g Each of the outer layers is made from:
ELVAMIDE 1.2 kg
Methanol 10.8 kg
Polyurethane 400 g
Surfactant 800 g The table below reflects some observations made from three different samples under several cure and assembly conditions.

| Sample | Cure Time | Cure Temp | Assembly | Breakloose, in-lb |
|---|---|---|---|---|
| LOCTITE 567 | 24 hr | RT | Hand tight plus ¼ turn | 22 |
| LOCTITE 567 | 1 hr | 300° F. (full) | Hand tight plus ¼ turn | 103 |
| A | 24 hr | RT | Hand tight plus ¼ turn | 150 |
| A | 1 hr | 300° F. (full) | Hand tight plus ¼ turn | 229 |
| A | 1 hr | RT | 240 in-lb | 510 |
| A | 24 hr | RT | 240 in-lb | 668 |
| A | 96 hr | RT | 240 in-lb | 632 |
| Control | 24 hr | RT | Hand tight plus ¼ turn | 57 |
| Control | 168 hr | RT | Hand tight plus ¼ turn | 48 |

LOCTITE 567 is a liquid anaerobic thread sealant containing Bisphenol A fumarate resin (30-60%), Polyglycol dimethacrylate (10-30%), Polyglycol laurate (10-30%), Polyethylene glycol monoocoate (10-30%), Poly(tetrafluoroethylene) (5-10%), Titanium dioxide (1-5%), Silica, amorphous, fumed (1-5%), Saccharin (1-5%) and Ethylene glycol (0.1-1%). The control was made in accordance with the teaching of Moran.

The samples were each placed or dispensed onto a portion of the threaded element of steel plugs. More specifically, the sample was applied from the spool rotating around the threaded element in a clockwise direction, with three full wraps of tape applied. Immediately thereafter a pipe tee was mated with the threaded element to form an assembly. The assembly was allowed to cure under the conditions noted. Breakloose strength—the torque required to begin to loosen the plug—was measured, and recorded in the rightmost column. Other portions of Sample A were each placed or dispensed onto a portion of the threaded element of ½″ steel plugs, and open time measurements of greater than 4 weeks were observed.

Open time measurements on steel and galvanized steel show 4 weeks; on black oxide show 6 weeks; and calcium, zinc and stainless steel show 20 weeks.

As can be seen, greater breakloose strength in a more rapid period of time is observed with Sample A.

Below is a listing of the identity and ranges of components used to form the middle layer of Sample B.

| Components | CAS No. | Amount (wt. %) |
|---|---|---|
| Polyglycol dimethacrylate | 25852-47-5 | 30-60 |
| Acrylonitrile, polymer with 1,3-butadiene and isoprene | 25135-90-4 | 10-30 |
| Hydroxyalkyl methacrylate | 27813-02-1 | 10-30 |
| Silica, amorphous, fumed, crystal-free | 112945-52-5 | 5-10 |
| Cumene hydroperoxide | 80-15-9 | 1-5 |
| Saccharin | 81-07-2 | 1-5 |
| Undecanoic acid, 11-amino-, homopolymer | 25587-80-8 | 1-5 |
| Caprolactam | 105-60-2 | 0.1-1 |
| 1-Acetyl-2-phenylhydrazine | 114-83-0 | 0.1-1 |

Like the samples above, Sample B was applied from the spool rotating around the threaded element in the clockwise direction, with three full wraps of tape applied.

When cured on degreased steel for 1 hour at room temperature, Sample B showed an average strength (unseated) of 15 in-lb. After a 24 hour cure at room temperature on degreased steel Sample B showed an average strength (seated) of 84 in-lb.

What is claimed is:

1. A method of manufacturing an anaerobic adhesive or sealant film adapted to be preapplied to a first surface to be mated and having an open time prior to mating with another surface, comprising the steps of:
    Providing an anaerobic adhesive or sealant film comprising:
        A first layer constructed from a nylon/urethane blend;
        A layer of anaerobic adhesive or sealant disposed on the first layer, wherein the anaerobic adhesive or sealant comprises a (meth)acrylate component; an anaerobic cure system; a polymeric matrix; and a rubber component in an amount of less than 20% by weight of the anaerobic adhesive; and
        A second layer constructed from a nylon/urethane blend;
    Providing a first surface to be mated;
    Applying the anaerobic adhesive or sealant film onto the first surface to be mated to form an anaerobic adhesive film or sealant preapplied onto the first surface to be mated;
    Allowing the anaerobic adhesive or sealant film preapplied onto the first surface to be mated to have an open time; and
    Providing a second surface to be mated with the anaerobic adhesive or sealant film preapplied first surface after the open time, wherein when mated the anaerobic adhesive or sealant film is disposed between the first and second surfaces to be mated and cures under anaerobic conditions within a period of time of about 24 hours at room temperature.

2. The method of claim 1, wherein the first surface to be mated comprises a threaded bolt.

3. The method of claim 1, wherein the second surface to be mated comprises a threaded nut.

4. The method of claim 1, wherein the threaded bolt and the threaded nut have complimentary threads.

\* \* \* \* \*